(12) United States Patent
Deeds

(10) Patent No.: US 7,146,188 B2
(45) Date of Patent: Dec. 5, 2006

(54) METHOD AND SYSTEM FOR REQUESTING PHOTOGRAPHS

(75) Inventor: Douglas Deeds, Bedford, TX (US)

(73) Assignee: Nokia Corporation, Espoo (FI)

( * ) Notice: Subject to any disclaimer, the term of this patent is extended or adjusted under 35 U.S.C. 154(b) by 219 days.

(21) Appl. No.: 10/356,693

(22) Filed: Jan. 31, 2003

(65) Prior Publication Data
US 2004/0152485 A1      Aug. 5, 2004

(51) Int. Cl.
*H04M 1/00*      (2006.01)

(52) U.S. Cl. .............................. 455/556.1; 455/456.1; 455/456.2; 455/567

(58) Field of Classification Search ............ 455/556.1, 455/456.1, 556.2, 566, 90.3, 525.1, 415, 455/456.2, 456.3, 557, 567, 575.1, 456.5, 455/456.6, 457, 440, 412.2, 414.1, 414.2, 455/515; 396/56, 311, 429; 348/207.1, 348/207.2

See application file for complete search history.

(56) References Cited

U.S. PATENT DOCUMENTS 6,628,899 B1 * 9/2003 Kito .............................. 396/56

2001/0022624 A1   9/2001 Hiroshi et al.
2004/0032503 A1   2/2004 Takao et al.
2004/0109199 A1 * 6/2004 Tsubaki ...................... 358/1.15
2004/0142708 A1 * 7/2004 Asada et al. ................. 455/466

FOREIGN PATENT DOCUMENTS

| EP | 1139684 A1 | 10/2001 |
|---|---|---|
| WO | WO 02/42717 | 5/2002 |
| WO | WO 03/003698 A1 | 1/2003 |

* cited by examiner

Primary Examiner—Pablo N. Tran
(74) Attorney, Agent, or Firm—Alston & Bird LLP

(57) ABSTRACT

A programmed, first communication device, such as a cell phone, operable by a first user in a celebrity mode for requesting a photograph, and operable in a paparazzi mode for taking a picture. When in the celebrity mode, a celebrity signal indicating that a photograph of the first user is desired, is transmitted to at least one second communication device operable in the paparazzi mode. When in the paparazzi mode, an indicator alerts the first user when a celebrity signal has been received so that the first user may take a picture of a second user of the at least one second communication device.

29 Claims, 2 Drawing Sheets

METHOD AND SYSTEM FOR REQUESTING PHOTOGRAPHS

TECHNICAL FIELD

The invention relates generally to photography and, more particularly, to a method and system for utilizing telecommunications to request taking and delivery of photographs.

BACKGROUND

Mobile phone handsets with integrated cameras have become popular, particularly in the Asia-Pacific market, and such popularity is growing around the world. However, all cameras, including those in mobile phone handsets, are inherently limited in their usability. Specifically, the owner of a camera cannot operate his/her camera to take a picture and at the same time also be in the picture he/she is taking. To overcome this limitation, the owner of the camera may hand the camera to another person and ask that other person to take the picture. Such other person, though, will often be a stranger, the trustworthiness of whom is generally not known. Moreover, a stranger may not know how to properly operate the camera to obtain the picture desired by the owner of the camera.

Another method that is available to the owner of a camera to facilitate the taking of a picture with the owner in it is to set the camera on a mount, such as a tripod, direct the camera to where a photograph is to be taken, set a timer on the camera to take a picture after a predetermined amount of elapsed time, and then pose in front of the camera until the photograph is taken. However, a drawback with such method is that it is difficult to properly adjust a camera when a subject of a photograph to be taken with the camera is not present in the view of the camera when the camera is being set up. Moreover, such photographs tend not to be candid. Still further, cameras integrated into mobile phone handsets do not typically include timers or the capability of being mounted on supports, such as tripods.

Accordingly, a continuing search has been directed to the development of methods and systems by which a person may not only obtain photographs of him/herself, but may obtain such photographs that are candid.

SUMMARY

The present invention, accordingly, provides for a programmed, first communication device, such as a cell phone, operable by a first user in a celebrity mode for requesting a photograph, and optionally operable in a paparazzi mode for taking a picture. When in the celebrity mode, a celebrity signal indicating that a photograph of the first user is desired, is transmitted to a second communication device operable in the paparazzi mode to request that a second user of the second communication device photograph the first user.

The first communication device is preferably also operable in the paparazzi mode. While in the paparazzi mode, and upon receipt of a celebrity signal from the second communication device, an indicator alerts the first user that the celebrity signal has been received so that the first user may take a picture of the second user of the second communication device.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning cameras, communication devices (e.g., cell phones), combinations thereof, and the like, have been omitted inasmuch as such details are not considered necessary to obtain a complete understanding of the present invention, and are considered to be within the skills of persons of ordinary skill in the relevant art.

It is noted that, unless indicated otherwise, all functions described herein are performed by a processor such as a computer, an electronic data processor, a microprocessor, or the like, in accordance with code such as computer program code, software, integrated circuits, and/or the like that are coded to perform such functions. Furthermore, it is considered that the design, development, and implementation details of all such code would be apparent to a person having ordinary skill in the art based upon a review of the present description of the invention.

Figure 1:
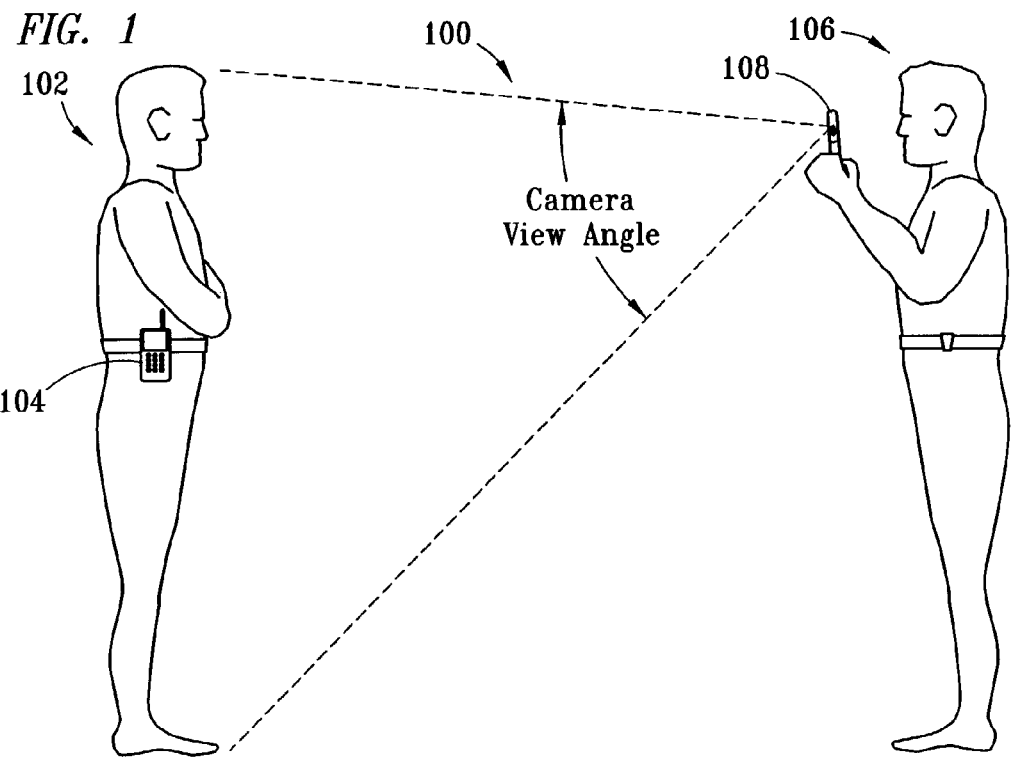
FIG. 1 depicts users of communication devices in a scenario embodying features of the present invention.

Referring to FIG. 1 of the drawings, the reference numeral 100 generally designates a scenario in which communication devices embodying features of the present invention may be utilized. Specifically, the scenario 100 depicted in FIG. 1 includes a first user 102 having a first communication device 104, and a second user 106 having a second communication device 108. The first and second communication devices 104 and 108 may comprise a cellular mobile telephone, a communicator, a multimedia phone, a personal digital assistant (PDA), a combination thereof, or the like, to at least one of which a camera (described further below with respect to FIG. 2) may be integrated or operatively connected.

Figure 2:
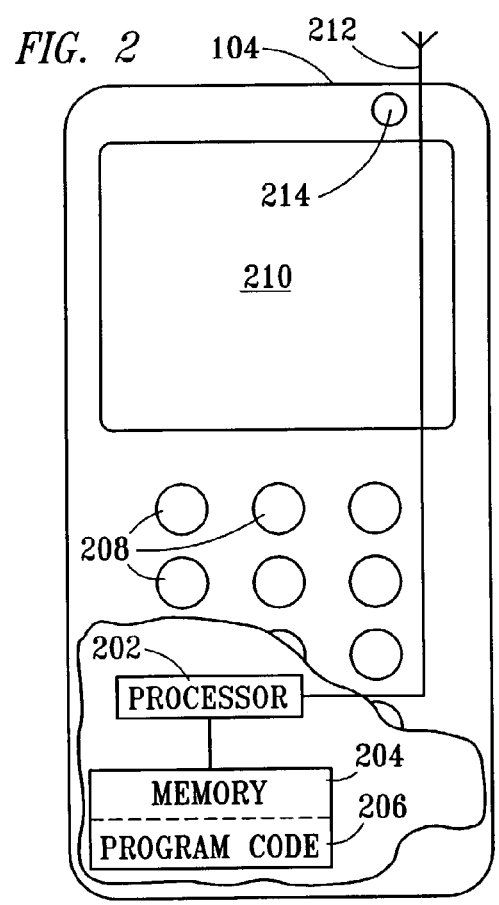
FIG. 2 depicts a front view of a representative communication device of FIG. 1.

FIG. 2 depicts details of the communication device 104 which preferably constitutes the communication devices 104 and 108 for operation in a "celebrity" mode (discussed further below with respect to FIG. 4). Accordingly, the communication device 104 includes a processor 202, and a memory 204 connected to the processor 202. The memory 204 preferably stores program code 206 comprising instructions effective for execution by the processor 202. A user input interface 208 (e.g., a number of keys) and a user output interface 210 (e.g., a display screen) are operatively connected to the processor 202. A transmitter 212, such as an antenna, is connected to the processor 202 for transmitting signals generated by the processor 202. Optionally, the communication device 104 also includes an indicator, such as a light emitting diode (LED), 214 connected to the processor 202 for providing a visual indication identifying the first communication device 104 to the second user 106 of the second communication device 108.

Figure 3:
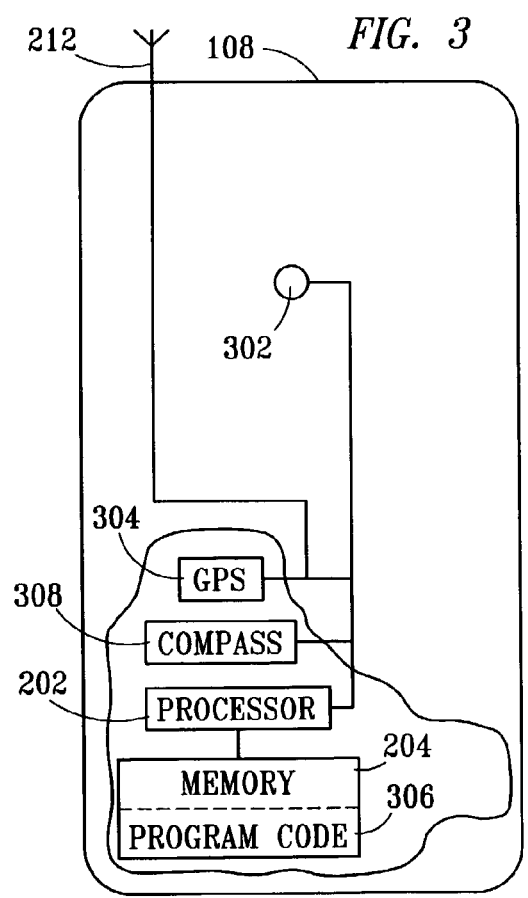
FIG. 3 depicts a back view of the representative communication device of FIG. 2.

FIG. 3 depicts details of the communication device 108 (viewed from a "back" side) which preferably constitutes the communication devices 104 and 108 for operation in a "paparazzi" mode (discussed further below with respect to FIG. 4). Accordingly, the communication device 108 includes the components described above with respect to FIG. 2 and, additionally, includes a camera 302 connected to the processor 202, and the program code 206 is modified to program code 306 to encompass operation of the camera 302. Optionally, a global positioning system (GPS) 304 and a compass 308 are also connected to the processor 202 for indicating to the processor 202, respectively, the location of the communication device 108 and the direction that the camera 302 is oriented for taking a photograph. It is noted that the term "photograph" is used herein to denote both still and moving images and pictures.

In accordance with the present invention, the program code 206 and 306 constituting the respective communication devices 104 and 108 is effective for enabling the respective communication devices to cooperate with each other in a number of different modes, including a "celebrity" mode and, optionally, also a "paparazzi" mode, as described further herein. In the celebrity mode, exemplified by the first communication device 104, the program code 206 in the first communication device 104 generates, and transmits to the second communication device 108, a celebrity signal indicating that the first user 102 desires to be photographed. The celebrity signal is preferably transmitted using wireless radio frequency (RF) technology, such as conventional cellular network technology, or alternatively via direct local transmission technology, such as Bluetooth™ technology.

Program code 206 in the first communication device 102 may optionally provide the celebrity signal with a number of additional elements, such as an image of the first user 102 so that the second user 106 of the second communication device 108 may readily locate and photograph the first user 102. Still further, the first communication device 104 may include a visual indicator, such as a flashing light emitting diode (LED) 214 or the screen display 210, that would preferably be activated in conjunction with the celebrity signal, and would be effective for generating a visual signal identifying the first user 102 to the second user 106.

The celebrity signal may also include a destination address 408 (described further below with respect to FIG. 4) to which a photograph taken by the second user 106 of the first user 102 should be sent for subsequent retrieval by the first user 102. By way of example, the destination address may define a selected one of a phone number of the first communication device 104, an email address, preferably accessible by a computer operable by the first user 102, an Internet web site address, preferably accessible by a computer operable by the first user 102, a combination thereof, and/or the like.

The celebrity signal may optionally also include message data for limiting the number of pictures that may be taken per a predetermined period of time by the second user 106 with the camera 302 of the second communication device 108 in response to the celebrity signal. The predetermined period of time is preferably set by the first user 102 and, by way of example and not limitation, may be a thirty minute period of time or a one hour period of time. The celebrity signal may optionally also include message data for indicating that a photograph and/or destination address should be deleted after the photograph is transmitted to the destination address. The celebrity signal may alternatively also include message data for indicating that the photograph and/or destination address should not be deleted until after a period of time specified by the user 102.

Still further, the celebrity signal may optionally include geographic disabling message data specifying a geographic area and/or a sector of a geographic area in which photographs may not be taken.

Still further, the celebrity signal may optionally include message data directing a cellular network (not shown), over which the celebrity signal is transmitted, to charge the first communication device 104 for air time required by the second communication device 108 to transmit the photograph of the first user 102.

In the paparazzi mode, exemplified by the second communication device 108, the celebrity signal transmitted by the first communication device 102 is received by the second communication device 106. The second communication device 108 is preferably provided with program code, responsive to receipt of the celebrity signal, for alerting to the second user 106 to take a photograph of the first user 102 of the first communication device 104. By way of example, the alert generated by the second communication device 106 may be an audible alert, a visible alert, a vibrational alert, a combination thereof, or the like. If an image of the first user 102 is provided with the celebrity signal, then the program code 306 may supplement the alert by displaying such image on the display screen of the communication device 108 to assist the second user 106 in identifying the first user 102.

The second communication device 106 preferably further comprises program code 306 responsive to receipt of the celebrity signal received from the first communication device 102 for generating and transmitting a confirmation signal back to the first communication device 102 confirming that the celebrity signal had been received by the second communication device 10. The confirmation signal is preferably transmitted using the same medium used by the first communication device 102 when transmitting the celebrity signal, e.g., conventional cellular network RF technology or direct local transmission technology, such as Bluetooth™ technology.

The program code 306 of the second communication device 106 preferably further comprises instructions for determining whether a celebrity signal includes a destination address to which a photograph taken in response to receipt of the celebrity signal should be sent and, if it does, for retrieving from the celebrity signal such destination address. Alternatively, if the celebrity signal does not include a destination address, then the second communication device 108 may send a photograph to the first communication device 104.

The program code 306 of the second communication device 106 preferably also comprises instructions responsive to other elements of the celebrity signal. For example, the program code 306 may comprise instructions for determining whether a celebrity signal includes, and responding accordingly to a celebrity signal having, message data limiting the number of photographs that may be taken per a predetermined period of time and, optionally, message data for deleting a photograph and/or destination address after the photograph is transmitted to the destination address.

Still further, the second communication device 108 optionally comprises a global positioning system (GPS) 304 for determining the geographic area in which the second communication device 108 is located, and associated instructions of program code 306 responsive to the celebrity signal with geographic restriction data, for disabling the camera 302 if the second communication device 108 is located within the particular geographic area defined by the celebrity signal geographic restriction data. The second communication device 108 may also include a compass 308 for determining a direction that the camera 302 is oriented for taking a photograph, and associated instructions of the program code 306 responsive to the celebrity signal with geographic restriction data, for disabling the camera 302 if the camera 302 is oriented for taking a picture within a sector of the aforementioned geographic area as defined by the celebrity signal geographic restriction data.

The program code 306 of the second communication device 106 preferably also comprises instructions for determining whether the celebrity signal includes message data directing air time required by the second communication device 108 to transmit the photograph of the first user 102 to be charged to the owner of the first communication device 104 and, if so, to indicate same to the second user 106.

The first and second communication devices 104 and 108 are preferably each operable in both the celebrity mode and in the paparazzi mode, either simultaneously or independently, with one or more or all of the aforementioned features. Alternatively, the first and second communication devices 104 and 108 may be limited to operation in only the celebrity mode or only the paparazzi mode, with one or more or all of the aforementioned features. It is understood that the selection of the foregoing modes and features are selectable by a user using conventional techniques, such as a menu on a display screen 210 of a communication device, which techniques are well-known to those skilled in the art and, therefore, will not be described in further detail herein.

Figure 4:
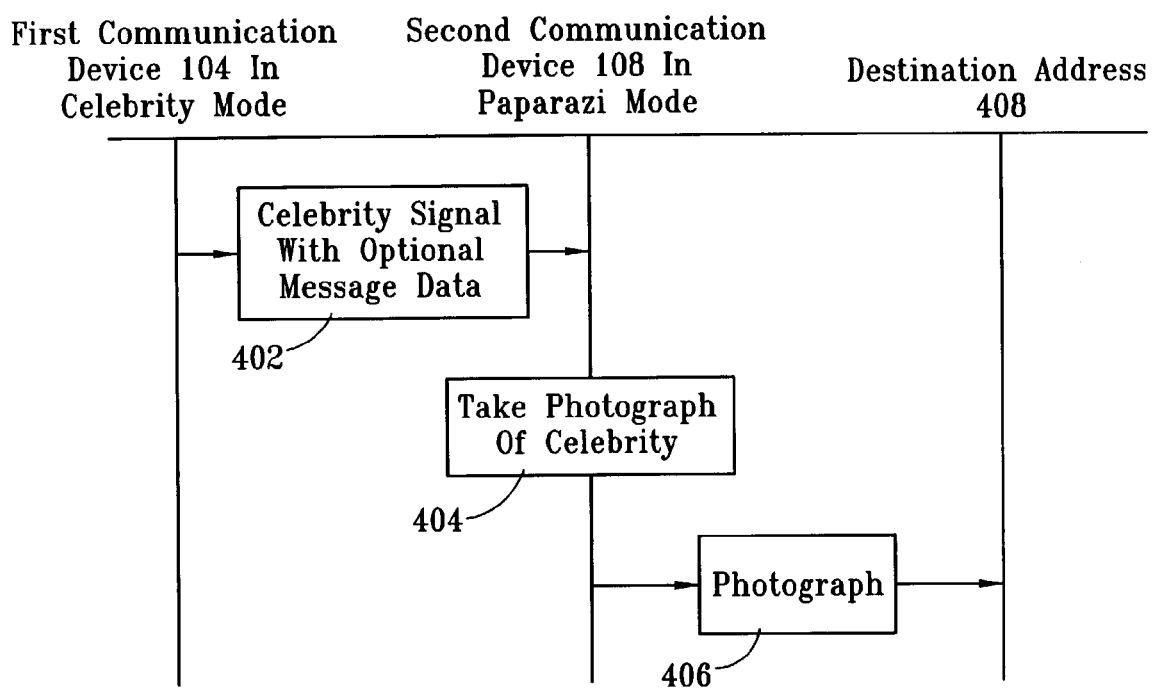
FIG. 4 depicts a high-level event sequence diagram embodying events of the present invention.

Referring to FIG. 4, in operation, when the first user 102 desires that a photograph be taken of him/herself, then in step 402, he/she activates the first communication device 104 to generate and transmit a celebrity signal to a second communication device 106. The user 102 may specify, via for example a menu displayed on the display screen 210, that the celebrity signal include a number of different elements, such as a destination address to which the photograph is to be sent, which destination address may be preset to a default, such as the phone number of the first communication device 104. The user 102 may also specify that information be provided in the celebrity signal to assist the second user 106 in identifying the first user 102, such as, by way of example, an image of the first user. The first communication device may also be activated to provide other identifying information, such as a flashing LED or colored display. The user 102 may still further specify that the celebrity signal comprise message data for limiting the number of photographs that may be taken per a predetermined period of time by the second communication device 108 in response to the celebrity signal. The user 102 may still further specify that the celebrity signal comprise message data directing a network charge the user 102 for air time required for the second communication device 108 to transmit the photograph of the first user 102. The user 102 may still further specify that the celebrity signal comprise geographic restriction data for disabling a camera of the second communication device 108 if the second communication device 108 is located within a geographic area defined by the geographic restriction data and, optionally, oriented for taking a picture within a sector of the specified geographic area, the sector being defined by the geographic restriction data.

Upon receiving the celebrity signal, the second communication device 108 preferably generates an alert to the second user 106 to take a photograph with the camera 302. The second communication device 108 may also generate a confirmation signal to the first communication device indicating that the celebrity signal had been received by the first communication device, in response to which the first communication device 104 may optionally discontinue transmitting the celebrity signal.

In response to the alert, in step 404 of FIG. 4, the second user 106 preferably attempts to photograph the first user 102 with the camera 302. If the celebrity signal includes geographic restriction data, the second communication device 108 checks with the GPS 304 and/or compass 308 to ensure that the second communication device 108 and camera 302 is not in a restricted geographic area and/or, optionally, oriented for taking a photograph in a restricted sector of the geographic area. If there are no geographic restrictions preventing the photograph from being taken, then, in step 406, the second communication device 108 transmits the photograph to the first user at a destination address 408 provided by the celebrity signal. Alternatively, if there are no geographic restrictions preventing the photograph from being taken, then the second communication device 108 could preclude a photograph from even being taken. If a destination address 408 is not provided in the celebrity signal, then the photograph would preferably be sent to the first communication device 104. The photograph and/or destination address 408 to which the photograph is sent would then, preferably, be deleted from the second communication device 108 after the photograph is transmitted. Alternatively, the destination address may be allowed to remain within the second communication device 108 for a predetermined period of time, as specified in the celebrity signal.

By the use of the present invention, a person (e.g., the first user 102) may not only obtain photographs of him/herself, but may obtain such photographs that are candid. Furthermore, a number of options may be specified by person, such as where the photograph is restricted from being taken, where the photograph is sent, how many photographs are taken, and who pays for the air time.

It is understood that the present invention may take many forms and embodiments. Accordingly, several variations may be made in the foregoing without departing from the spirit or the scope of the invention. For example, the geographic restriction data may be transmitted by property owners to all communication devices to restrict the taking of photographs in specified geographic areas or sectors or such geographic area. In another example, the communication device 108 and camera 302 may be distinct from each other, rather than integrated together, and operatively connected via an electrical cable or infra-red connection. Furthermore, the communication device 108 and camera 302, whether integrated or as distinct connected units, may be fixedly mounted, for example, for security surveillance or for manually and/or automatically taking photographs of people at amusement parks, rather than handled by a user 106.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A programmed, first communication device operable in a communication system further having at least one second communication device, the first communication device operable in a celebrity mode by a user and the at least one second communication device having communication means and, a second-device camera, said first communication device comprising:
   program code for determining whether said first communication device is in said celebrity mode;
   program code for generating, in response to a determination that said first communication device is in said celebrity mode, a first celebrity signal indicating that at least one photograph of said user is desired and including message data for limiting the number of pictures that may be taken per a predetermined period of time by said at least one second communication device in response to said first celebrity signal; and
   a transmitter configured for transmitting said first celebrity signal to said second communication device.

2. The first communication device of claim 1, further comprising program code for determining whether said first communication device is in said celebrity mode; and wherein said program code for generating is configured for generating said first celebrity signal in response to a determination that said first communication device is in said celebrity mode.

3. The first communication device of claim 1, wherein said first communication device is a selected one of a cellular mobile telephone, a communicator, a multimedia phone, a personal digital assistant (PDA), and a gaming device.

4. The first communication device of claim 1, wherein said transmitter is configured for transmitting said first celebrity signal directly to said at least one second communication device.

5. The first communication device of claim 1, wherein said transmitter is configured for transmitting said first celebrity signal via a cellular network to said at least one second communication device.

6. The first communication device of claim 1, wherein said first celebrity signal includes a destination address to which a photograph taken of said first user is to be forwarded for subsequent retrieval by a first user, said destination address defining a selected one of a phone number of said first communication device, an email address, and an Internet web site address.

7. The first communication device of claim 1, wherein said user is a first user, and wherein said first celebrity signal includes an image of said first user for identification of said first user by a second user of said second communication device.

8. The first communication device of claim 1, wherein said user is a first user, and said first communication device further comprises a visual indicator for generating a visual signal identifying said first user to a second user of said second communication device.

9. The first communication device of claim 1, wherein said first celebrity signal further comprises message data directing a network to charge said first user for air time required to transmit said photograph of said user.

10. The first communication device of claim 1, wherein said program code for generating said celebrity signal further comprises program code for including within said celebrity signal geographic restriction data for disabling a camera of said second communication device if the second communication device is located within a geographic area defined by said geographic restriction data.

11. The first communication device of claim 1, wherein said program code for generating said celebrity signal further comprises program code for including within said celebrity signal geographic restriction data for disabling the camera of said second communication device if said second communication device is located within a geographic area defined by said geographic restriction data and oriented for taking a picture within a sector of said geographic area, said sector being defined by said geographic restriction data.

12. The first communication device of claim 1, wherein said user is a first user, wherein said first communication device is further operable in a paparazzi mode, and wherein said first communication device further comprises:
   a first-device camera connected to said first communication device;
   a receiver configured for receiving a second celebrity signal transmitted by said at least one second communication device; and
   program code responsive to receipt of said second celebrity signal for generating an alert to said first user to take a photograph with said first-device camera of a second user of said at least one second communication device.

13. The first communication device of claim 12, further comprising program code for determining whether said first communication device is in said paparazzi mode; and wherein said receiver is configured, responsive to a determination that said first communication device is in said paparazzi mode, for receiving said second celebrity signal transmitted by said at least one second communication device.

14. The first communication device of claim 12, wherein said first-device camera is integrated into said first communication device.

15. The first communication device of claim 12, wherein said first-device camera is a distinct unit from said first communication device.

16. The first communication device of claim 12, wherein said alert is at least one of an audible alert, a visible alert, and a vibrational alert.

17. The first communication device of claim 12, further comprising program code responsive to receipt of said second celebrity signal, for generating a confirmation signal to said at least one second communication device indicating that said second celebrity signal had been received by said first communication device.

18. The first communication device of claim 12, further comprising program code for transmitting and deleting a photograph taken in response to receipt of said second celebrity signal.

19. The first communication device of claim 12, further comprising:
   program code for transmitting to a destination address provided in said second celebrity signal, a photograph taken in response to receipt of said second celebrity signal; and
   program code for deleting said photograph and destination address after said photograph is transmitted.

20. The first communication device of claim 12, further comprising:
   program code for transmitting to a destination address provided in said second celebrity signal, a photograph taken in response to receipt of said second celebrity signal; and program code for deleting said photograph after said photograph is transmitted.

21. The first communication device of claim 12, further comprising:
   program code for transmitting to a destination address provided in said second celebrity signal, a photograph taken in response to receipt of said second celebrity signal, said destination address being a selected one of a phone number of said first communication device, an email address, and an Internet web site; and
   program code for deleting said photograph and destination address after said photograph is transmitted.

22. The first communication device of claim 12, further comprising:
   a global positioning system (GPS) for determining the geographic area in which said first communication device is located; and
   program code responsive to said second celebrity signal comprising geographic restriction data for disabling said first device camera if said first communication device is located within a geographic area defined by said geographic restriction data.

23. The first communication device of claim 12, further comprising:
   a global positioning system (GPS) for determining the geographic area in which said first communication device is located;
   a compass for determining a direction that said camera is oriented for taking a photograph; and
   program code responsive to said second celebrity signal comprising geographic restriction data for disabling said camera if said first communication device is located within a geographic area defined by said geographic disabling message and is oriented for taking a photograph within a sector of said geographic area, said sector being defined by said geographic restriction data.

24. The first communication device of claim 12, wherein said first communication device is simultaneously operable in said celebrity mode and said paparazzi mode.

25. The first communication device of claim 12, wherein said first communication device is operable in said paparazzi mode independently of said celebrity mode.

26. A method executable by a first communication device operable in a communication system further having at least one second communication device, the first communication device, the first communication device operable in a celebrity mode by a first user for requesting a photograph, and the at least one second communication device having communication means and a second-device camera, the method comprising steps of:
   determining whether said first communication device is in said celebrity mode;
   generating a first celebrity signal indicating that a photograph of said first user is desired, the first celebrity signal further including message data for limiting the number of pictures that may be taken per a predetermined time period by said at least one second communication device in response to said first celebrity signal; and
   transmitting said first celebrity signal to said at least one second communication device.

27. A programmed, first communication device operable in a communication system further having at least one second communication device, the first communication device operable in a celebrity mode by a user and the at least one second communication device having communication means and, a second-device camera, said first communication device comprising:
   program code for determining whether said first communication device is in said celebrity mode;
   program code for generating, in response to a determination that said first communication device is in said celebrity mode, a first celebrity signal indicating that at least one photograph of said user is desired and the first celebrity signal further including geographic restriction data for disabling a camera of said second communication device if the second communication device is located within a geographic area defined by said geographic restriction data; and
   a transmitter configured for transmitting said first celebrity signal to said second communication device.

28. A programmed, first communication device operable in a communication system further having at least one second communication device, the first communication device operable in a celebrity mode by a user and the at least one second communication device having communication means and, a second-device camera, said first communication device comprising:
   program code for determining whether said first communication device is in said celebrity mode;
   program code for generating, in response to a determination that said first communication device is in said celebrity mode, a first celebrity signal indicating that at least one photograph of said user is desired and the first celebrity signal further including geographic restriction data for disabling the camera of said second communication device if said second communication device is located within a geographic area defined by said geographic restriction data and oriented for taking a picture within a sector of said geographic area, said sector defined by said geographic restriction data; and
   a transmitter configured for transmitting said first celebrity signal to said second communication device.

29. A programmed, first communication device operable in a communication system further having at least one second communication device, the first communication device operable in a celebrity mode by a user and in a paparazzi mode by the user, and the at least one second communication device having communication means and, a second-device camera, said first communication device comprising:
   program code for determining whether said first communication device is in said celebrity mode;
   program code for generating, in response to a determination that said first communication device is in said celebrity mode, a first celebrity signal indicating that at least one photograph of said user is desired;
   a transmitter configured for transmitting said first celebrity signal to said second communication device;
   a first device camera connected to said first communication device;
   a receiver configured for receiving a second celebrity signal transmitted by said at least one second communication device; and
   program code responsive to receipt of said second celebrity signal for generating an alert to said first user to take a photograph with said first-device camera of a second user of said at least one second communication device.

* * * * *